Patented Oct. 24, 1939

2,177,049

UNITED STATES PATENT OFFICE 2,177,049

METHOD OF PREPARING AROMATIC MERCURY SALTS OF ORGANIC ACIDS

Carl N. Andersen, Wellesley Hills, Mass., assignor to Lever Brothers Company, a corporation of Maine No Drawing. Application September 14, 1936, Serial No. 100,677

16 Claims. (Cl. 260—434)

The present invention relates to a method of preparing aromatic mercury salts, and more particularly to a method of preparing salts of the general formula $(RHg)_x.R_1$, in which R represents an aromatic structure, which may be an aromatic nucleus with or without side chains, and in which none of the nuclear or side chains carbons has direct linkage with any element other than hydrogen, carbon or mercury; in which $R_1$ represents an organic acid radical to which the RHg group or groups are linked through replacement of the acid hydrogen atom or atoms; and in which $x$ represents the number of RHg groups in the salt and is an integer having a value of at least one and not more than the number of acidic hydrogens in the organic acid. The expression "aromatic structure" as used herein is intended to be generic and include an aromatic nucleus with or without side chains.

The radical R may be the phenyl group, $C_6H_5$, or a mono or polycyclic hydrocarbon group having a nucleus similar to the phenyl group, as, for example, aromatic hydrocarbon groups in which all of the nuclear carbons, other than the one attached to mercury, and any side chain carbons have their valences satisfied by hydrogen or another carbon. Examples are the diphenyl, naphthyl, xylyl, and tolyl groups.

The radical $R_1$ may be the radical of any organic acid.

I have found that when any soluble aromatic mercury salt of the RHg type, particularly a soluble phenylmercury salt of a carboxylic acid, is brought under suitable reacting conditions into the presence of an organic acid, the aromatic mercury radical is substituted for the acid hydrogen of the organic acid with the formation of the aromatic mercury salt of the organic acid and the regeneration of the acid that was originally combined with the aromatic mercury group. The salt which forms has a relatively low solubility as compared with the soluble aromatic mercury salt used and with the acid formed in the substitution, so that the separation of the salt in pure form presents no difficulty.

The aromatic mercury salt may be any salt whose solubility is greater than that of the salt to be formed by the reaction. Those which I have found to be particularly adapted for use in this method are the acetate and the lactate. Both of these salts possess relatively high solubilities as compared with most aromatic mercury salts. Phenylmercury acetate, for example, has a solubility of about 1 part, and phenylmercury lactate has a solubility of about 1.75 parts, in 100 parts of water at 20° C. It will be understood, however, that any other aromatic mercury salt may be used that is capable, when brought into a reacting relationship with an organic acid, of substituting its aromatic mercury radical for the acid hydrogen of the organic acid to produce a less soluble salt.

The method comprising my invention may be practiced by bringing together the aromatic mercury salt and the organic acid under any suitable reacting conditions. This is generally most conveniently accomplished by employing a reacting medium, such as any inert liquid. For example, the aromatic mercury salt may be dissolved or suspended in a liquid and this added to the organic acid, or the acid may be added to a liquid containing the aromatic mercury salt. The acid, likewise, may first be placed in the liquid and to this the aromatic mercury salt may be added. Any inert liquid medium may be employed inasmuch as its only function is to bring the reacting components together. Water is convenient to use because of its availability. Other solvents are equally satisfactory such as the alcohols of low molecular weight, benzol, acetone, or any other suitable inert organic solvent. When the organic acid is normally liquid, it is often possible to effect the substitution reaction by mixing the solid aromatic mercury salt with the liquid acid, and then separating the resulting salt by washing away, with water or other solvent, the acid regenerated in the process. There are very few instances in which an acid exists in a liquid, anhydrous state and for most practical purposes, therefore, at least a small amount of an inert liquid medium will be present in the acid.

If the acid is not readily available, per se, it may be prepared from the anhydride, the lactone, etc., and this preparation may immediately precede the reaction with the aromatic mercury salt if it is desired.

In carrying out my process, theoretical quantities of the acid and the aromatic mercury salt are employed, but in some instances, as in some of the examples to be set forth, a small excess of the acid may be employed. This insures the complete conversion of the aromatic mercury constituent into the desired salt. Inasmuch as the acids in most instances are relatively soluble, as compared with the salts prepared which are generally difficultly or sparingly soluble in water, no problem is presented in separating the excess acid from the salt produced in the reaction.

If the acid is polybasic, one or more, including all, of the acid hydrogens may be replaced by the RHg group. The number of the hydrogens replaced depends upon the amounts of the reacting components employed. If less than all the acid hydrogens are replaced the corresponding acid salts are produced. Mixed salts in which the acidic hydrogens are replaced by different radicals may be prepared from polybasic acids. The mixed salts may have different aromatic mercury radicals and may be produced by employing two aromatic mercury compounds in the reaction. For example, molar quantities of phenylmercury acetate and tolylmercury acetate may be reacted with 2 moles of a dibasic acid. Similarly, mixed salts in which other positive radicals replace one or more of the acid hydrogens, for example alkali metals, may be prepared by employing an alkali metal base in the reaction, or by reacting an alkali metal acid salt of an organic acid with the aromatic mercury compound.

The process may be carried out at any reaction temperature, for example, room temperature. It is convenient, however, to use heat inasmuch as this facilitates the solubility of the reacting components and speeds the reaction.

I have applied the method in preparing salts of numerous representative organic acids. The acid which may be used in my invention may have any organic structure, for example, aliphatic, carbocyclic or heterocyclic. The acid hydrogen of the organic acid may be contained in any acid group, for example, the carboxylic group or the sulphonic group. The organic acids may be mono or polybasic and may be substituted or unsubstituted. The cyclic acids may be mono or polynuclear and the acid radical may be contained in the nucleus or in a side chain.

The following examples are given merely as illustrative of my invention heretofore described.

Example 1

6.72 grams of phenylmercury acetate is dissolved in 2 liters of water. The solution is then filtered and to the filtrate is added 1.60 grams of adipic acid in 100 cc. of water. The resulting mixture is brought to boiling and allowed to stand until precipitation is complete. The precipitate is then separated by filtration, washed thoroughly with water and dried at 110° C. The resulting product is a white crystalline powder. This product melts at 202° C. and is the compound diphenylmercury adipate.

Example 2

6.72 grams of phenylmercury acetate is dissolved in 2 liters of water. The solution is then filtered. To the filtrate is added 1.47 grams of malic acid dissolved in 100 cc. of water. The solution is brought to boiling and then allowed to stand until precipitation is completed. The precipitate is then filtered off, washed and dried. The resulting product melts at 202° C. It is the compound diphenylmercury malate.

The compound may also be prepared by dissolving the same quantity of phenylmercury acetate in 1 liter of alchol at room temperature with agitation. To this solution is added 1.47 grams of malic acid dissolved in 100 cc. of alcohol. The solution is concentrated by evaporation and crystals precipitate. The crystals are filtered off, washed with alcohol and dried. The resulting product melts at 202° C. and is the compound diphenylmercury malate.

Example 3

3.36 grams of phenylmercury acetate is dissolved in 1 liter of water. The solution is filtered. To the filtrate is added 1.51 grams of salicyclic acid in aqueous solution. The resulting mixture is brought to boiling and allowed to stand until precipitation is complete. The precipitate is then separated by filtration, washed thoroughly with distilled water and dried. The resulting product is a white crystalline substance melting at 158° C. It is the compound phenylmercury salicylate.

Example 4

20.16 grams of phenylmercury acetate is mixed with 50 cc. of hot water. The mixture is stirred well and to it is added 7.2 grams of ethyl sulphonic acid. The mixture is refluxed for a few minutes and 200 cc. of hot water is added. The solution is filtered hot and then allowed to stand and cool. White crystals separate which are separated by filtration, washed well with cold water and recrystallized. Upon heating, the product appears wet at 182° C. and puffs up at 186° C. It is the compound phenylmercury ethyl sulphonate.

Example 5

7.36 grams of phenylmercury acetate is dissolved in 1 liter of water. The solution is filtered to remove any insoluble material. To the filtrate is added an aqueous solution containing 4.31 grams of gluconic acid. The solution is permitted to stand until crystallization is complete and the precipitated material is separated by filtration, washed thoroughly with warm water and dried. The product melts at 162–164° C. with decomposition and is the compound phenylmercury gluconate.

Example 6

20 grams of phenylmercury acetate is dissolved in 2 liters of water and heated to facilitate solution. The solution is filtered to remove any insoluble material. To the filtrate is added 13.3 grams of quininic acid dissolved in 100 cc. of alcohol. A precipitate results and the mixture is allowed to cool after which it is filtered. The precipitate is washed well with warm water and dried. The resulting product has a melting point of 207° C. with decomposition, and is the compound phenylmercury quininate.

Example 7

20.16 grams of phenylmercury acetate is dissolved in 4 liters of water and filtered to remove any insoluble material. To the filtrate is added 16.43 grams of Cinchophen (2-phenyl quinoline 4-carboxylic acid) dissolved in 1 liter of alcohol. A precipitate results and the mixture is allowed to stand after which the precipitate is separated by filtration, washed well with warm water and dried. Upon heating the product a transition in crystallization occurs at 150° C. and melting at 204–208° C. It is the compound phenylmercury 2-phenyl quinoline 4-carboxylate.

Example 8

20.16 grams of phenylmercury acetate is dissolved in 2 liters of water and heated to facilitate solution. The solution is filtered to remove any insoluble material. To the filtrate is added an aqueous solution containing 22.1 grams of ortho-sulfamido benzoic acid. A pink precipitate results and the mixture is allowed to stand after which the precipitate is filtered, washed well with warm water and dried. The product has a melting point of 142–143° C. and is the compound phenylmercury ortho-sulfamido benzoate.

Example 9

20.64 grams of phenylmercury acetate is dissolved in 2 liters of water and heated to facilitate solution. The solution is filtered to remove any insoluble material. To the filtrate is added 11.35 grams of alpha-naphthoic acid. The mixture is allowed to stand and cool after which it is filtered. The precipitate is washed well with warm water and dried. The product has the melting point of 108.5–109° C. It is the compound phenylmercury alpha-naphthoate.

Example 10

20.16 grams of phenylmercury acetate is dissolved in 2 liters of water and heated to facilitate solution. The solution is filtered to remove any insoluble material. To the filtrate is added 11.94 grams of Tyrosin (1-amino acid of p-hydroxy phenyl propionic acid). A precipitate results which is separated by filtration, washed with warm water, dried and recrystallized from alcohol. Upon heating the material it darkens at 150° C. and decomposes at 240° C. It is the phenylmercury carboxylate of Tyrosin.

Example 11

40.32 grams of phenylmercury acetate is dissolved in 4 liters of water and heated to facilitate solution. The solution is filtered to remove any insoluble material. To the filtrate is added 20.58 grams of ortho-chloro benzoic acid dissolved in 250 cc. of alcohol. A white milky solution results and upon standing a precipitate separates which is removed by filtration, washed well with warm water and dried. The product has a melting point of 108–110° C. and is the compound phenylmercury ortho-chloro benzoate.

It will be obvious that various modifications in details of the procedure may be employed without departing from the scope of the invention which is not to be deemed as limited by the illustrations or in any way except as indicated in the appended claims.

This application is a continuation in part of application Serial No. 694,199, filed October 18, 1933.

I claim:

1. The method of preparing aromatic mercury salts wherein an aromatic mercury group is linked with an organic acid radical by replacement of the acidic hydrogen of the organic acid, which comprises reacting in an inert liquid an organic acid the acidic hydrogen of which is linked through oxygen, with an aromatic mercury soluble salt of a soluble acid in which the mercury is directly connected to a nuclear carbon of an aromatic structure in which none of the carbon atoms has direct linkage with any element other than hydrogen, carbon or mercury, said reacting aromatic mercury salt being of an acid weaker than said reacting organic acid, and said reacting organic acid forming an aromatic mercury salt that is less soluble under the reaction conditions than said reacting aromatic mercury salt and said reacting organic acid.

2. The method of preparing aromatic mercury salts wherein an aromatic mercury group is linked with a carboxylic acid radical by replacement of the acidic hydrogen of the carboxylic acid, which comprises reacting in an inert liquid a carboxylic acid with an aromatic mercury soluble salt of a soluble acid in which the mercury is directly connected to a nuclear carbon of an aromatic structure in which none of the carbon atoms has direct linkage with any element other than hydrogen, carbon, or mercury, said reacting aromatic mercury salt being of an acid weaker than said reacting carboxylic acid, and said reacting carboxylic acid forming an aromatic mercury salt that is less soluble under the reaction conditions than said reacting aromatic mercury salt and said reacting carboxylic acid.

3. The method of preparing aromatic mercury salts wherein an aromatic mercury group is linked with an aliphatic carboxylic acid radical by replacement of the acidic hydrogen of the aliphatic carboxylic acid, which comprises reacting in an inert liquid an aliphatic carboxylic acid with an aromatic mercury soluble salt of a soluble acid in which the mercury is directly connected to a nuclear carbon of an aromatic structure in which none of the carbon atoms has direct linkage with any element other than hydrogen, carbon, or mercury, said reacting aromatic mercury salt being of an acid weaker than said reacting aliphatic carboxylic acid, and said reacting aliphatic carboxylic acid forming an aromatic mercury salt that is less soluble under the reaction conditions than said reacting aromatic mercury salt and said reacting aliphatic carboxylic acid.

4. The method of preparing aromatic mercury salts wherein an aromatic mercury group is linked with an aromatic carboxylic acid radical by replacement of the acidic hydrogen of the aromatic carboxylic acid, which comprises reacting in an inert liquid an aromatic carboxylic acid with an aromatic mercury soluble salt of a soluble acid in which the mercury is directly connected to a nuclear carbon of an aromatic structure in which none of the carbon atoms has direct linkage with any element other than hydrogen, carbon, or mercury, said reacting aromatic mercury salt being of an acid weaker than said reacting aromatic carboxylic acid, and said reacting aromatic carboxylic acid forming an aromatic mercury salt that is less soluble under the reaction conditions than said reacting aromatic mercury salt and said reacting aromatic carboxylic acid.

5. The method of preparing phenylmercury salts wherein the phenylmercury group is linked with an organic acid radical by the replacement of the acidic hydrogen of the organic acid, which comprises reacting in an inert liquid an organic acid the acidic hydrogen of which is linked through oxygen, with a phenylmercury soluble salt of a soluble acid, said reacting phenylmercury salt being of an acid weaker than said reacting organic acid, and said reacting organic acid forming a phenylmercury salt that is less soluble under the reaction conditions than said reacting phenylmercury salt and said reacting organic acid.

6. The method of preparing phenylmercury salts wherein the phenylmercury group is linked with a carboxylic acid radical by the replacement of the acidic hydrogen of the carboxylic acid, which comprises reacting in an inert liquid a carboxylic acid with a phenylmercury soluble salt of a soluble acid, said reacting phenylmercury salt being of an acid weaker than said reacting carboxylic acid, and said reacting carboxylic acid forming a phenylmercury salt that is less soluble under the reaction conditions than said reacting phenylmercury salt and said reacting carboxylic acid.

7. The method of preparing phenylmercury salts wherein the phenylmercury group is linked with an aliphatic carboxylic acid radical by the replacement of the acidic hydrogen of the aliphatic carboxylic acid, which comprises reacting in an inert liquid an aliphatic carboxylic acid with a phenylmercury soluble salt of a soluble acid, said reacting phenylmercury salt being of an acid weaker than said reacting aliphatic carboxylic acid, and said reacting aliphatic carboxylic acid forming a phenylmercury salt that is less soluble under the reaction conditions than said reacting phenylmercury salt and said reacting aliphatic carboxylic acid.

8. The method of preparing phenylmercury salts wherein the phenylmercury group is linked with an aromatic carboxylic acid radical by the replacement of the acidic hydrogen of the aromatic carboxylic acid, which comprises reacting in an inert liquid an aromatic carboxylic acid with a phenylmercury soluble salt of a soluble acid, said reacting phenylmercury salt being of an acid weaker than said reacting aromatic carboxylic acid, and said reacting aromatic carboxylic acid forming a phenylmercury salt that is less soluble under the reaction conditions than said reacting phenylmercury salt and said reacting aromatic carboxylic acid.

9. The method of preparing aromatic mercury salts wherein an aromatic mercury group is linked with an organic acid radical by the replacement of the acidic hydrogen of the organic acid, which comprises reacting in an inert liquid an organic acid the acidic hydrogen of which is linked through oxygen, with an aromatic mercury acetate in which the mercury is directly connected to a nuclear carbon of an aromatic structure in which none of the carbon atoms has direct linkage with any element other than hydrogen, carbon, or mercury, said reacting organic acid being stronger than acetic acid and forming an aromatic mercury salt that is less soluble under the reaction conditions than said reacting aromatic mercury acetate and said reacting organic acid.

10. The method of preparing aromatic mercury salts wherein an aromatic mercury group is linked with a carboxylic acid radical by the replacement of the acidic hydrogen of the carboxylic acid, which comprises reacting in an inert liquid a carboxylic acid with an aromatic mercury acetate in which the mercury is directly connected to a nuclear carbon of an aromatic structure in which none of the carbon atoms has direct linkage with any element other than hydrogen, carbon, or mercury, said reacting carboxylic acid being stronger than acetic acid and forming an aromatic mercury salt that is less soluble under the reaction conditions than said reacting aromatic mercury acetate and said reacting carboxylic acid.

11. The method of preparing aromatic mercury salts wherein an aromatic mercury group is linked with an aliphatic carboxylic acid radical by the replacement of the acidic hydrogen of the aliphatic carboxylic acid, which comprises reacting in an inert liquid an aliphatic carboxylic acid with an aromatic mercury acetate in which the mercury is directly connected to a nuclear carbon of an aromatic structure in which none of the carbon atoms has direct linkage with any element other than hydrogen, carbon, or mercury, said reacting aliphatic carboxylic acid being stronger than acetic acid and forming an aromatic mercury salt that is less soluble under the reaction conditions than said reacting aromatic mercury acetate and said reacting aliphatic carboxylic acid.

12. The method of preparing aromatic mercury salts wherein an aromatic mercury group is linked with an aromatic carboxylic acid radical by the replacement of the acidic hydrogen of the aromatic carboxylic acid, which comprises reacting in an inert liquid an aromatic carboxylic acid with an aromatic mercury acetate in which the mercury is directly connected to a nuclear carbon of an aromatic structure in which none of the carbon atoms has direct linkage with any element other than hydrogen, carbon, or mercury, said reacting aromatic carboxylic acid being stronger than acetic acid and forming an aromatic mercury salt that is less soluble under the reaction conditions than said reacting aromatic mercury acetate and said reacting aromatic carboxylic acid.

13. The method of preparing phenylmercury salts wherein the phenylmercury group is linked with an organic acid radical by replacement of the acidic hydrogen of the organic acid, which comprises reacting in an inert liquid an organic acid the acidic hydrogen of which is linked through oxygen, with phenylmercury acetate, said reacting organic acid being stronger than acetic acid and forming a phenylmercury salt that is less soluble under the reaction conditions than said reacting phenylmercury acetate and said reacting organic acid.

14. The method of preparing phenylmercury salts wherein the phenylmercury group is linked with a carboxylic acid radical by replacement of the acidic hydrogen of the carboxylic acid, which comprises reacting in an inert liquid a carboxylic acid with phenylmercury acetate, said reacting carboxylic acid being stronger than acetic acid and forming a phenylmercury salt that is less soluble under the reaction conditions than said reacting phenylmercury acetate and said reacting carboxylic acid.

15. The method of preparing phenylmercury salts wherein the phenylmercury group is linked with an aliphatic carboxylic acid radical by replacement of the acidic hydrogen of the aliphatic carboxylic acid, which comprises reacting in an inert liquid an aliphatic carboxylic acid with phenylmercury acetate, said reacting aliphatic carboxylic acid being stronger than acetic acid and forming a phenylmercury salt that is less soluble under the reaction conditions than said reacting phenylmercury acetate and said reacting aliphatic carboxylic acid.

16. The method of preparing phenylmercury salts wherein the phenylmercury group is linked with an aromatic carboxylic acid radical by replacement of the acidic hydrogen of the aromatic carboxylic acid, which comprises reacting in an inert liquid an aromatic carboxylic acid with phenylmercury acetate, said reacting aromatic carboxylic acid being stronger than acetic acid and forming a phenylmercury salt that is less soluble under the reaction conditions than said reacting phenylmercury acetate and said reacting aromatic carboxylic acid.

CARL N. ANDERSEN.